US012640561B2

(12) United States Patent
Goergen et al.

(10) Patent No.: US 12,640,561 B2
(45) Date of Patent: May 26, 2026

(54) SYSTEMS AND METHODS FOR BALANCING ENERGY USAGE

(71) Applicant: Cisco Technology, Inc., San Jose, CA (US)

(72) Inventors: Joel Richard Goergen, Soulsbyville, CA (US); Angelo Fienga, Rome (IT); Maria Soledad Palmero, Toledo (ES); Hazim Hashim Dahir, Wake Forest, NC (US); Elizabeth Kochuparambil, Morgan Hill, CA (US); Jonathan D. Austin, San Jose, CA (US); Kevin Robert Mechler, Austin, TX (US); Jenjen Tiao, Allentown, PA (US); Jennifer Nicole Stallings, Cedar Park, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 360 days.

(21) Appl. No.: 18/360,248

(22) Filed: Jul. 27, 2023

(65) Prior Publication Data

US 2024/0356332 A1 Oct. 24, 2024

Related U.S. Application Data

(60) Provisional application No. 63/497,512, filed on Apr. 21, 2023.

(51) Int. Cl.
*H02J 3/00* (2026.01)
*H02J 103/30* (2026.01)

(52) U.S. Cl.
CPC ........... *H02J 3/003* (2020.01); *H02J 2103/30* (2026.01)

(58) Field of Classification Search
CPC .............................. H02J 3/003; H02J 2203/20
See application file for complete search history.

(56) References Cited

U.S. PATENT DOCUMENTS

| | | | |
|---|---|---|---|
| 10,244,086 B2 * | 3/2019 | Newman, Jr. ....... | H04L 12/2836 |
| 2009/0006876 A1 * | 1/2009 | Fukatani ............... | G06F 3/0625 |
| | | | 713/320 |

(Continued)

OTHER PUBLICATIONS

Antoniou, G., et al., "Web Ontology Language: OWL," Handbook on Ontologies, May 2003, 27 pages.

(Continued)

*Primary Examiner* — Ziaul Karim
(74) *Attorney, Agent, or Firm* — Edell, Shapiro & Finnan, LLC

(57) ABSTRACT

Presented herein are techniques for balancing energy usage. A method can include obtaining energy consumption patterns of a plurality of devices that consume energy in an environment from a plurality of data sources. The method can further include analyzing operational patterns of the plurality of devices that are dynamically controllable and associated with the environment to generate device data. The method can further include building and maintaining multiple domain ontologies for sustainability profiles. The method can further include developing a profile for energy consumption for at least one device of the plurality of devices, wherein the profile is based on the energy consumption patterns, the device data, and at least one sustainability profile of the multiple domain ontologies.

20 Claims, 7 Drawing Sheets

(56) References Cited

U.S. PATENT DOCUMENTS

| | | | | |
|---|---|---|---|---|
| 2010/0217550 A1* | 8/2010 | Crabtree | ................ | H02J 3/007 |
| | | | | 702/62 |
| 2012/0277921 A1* | 11/2012 | Shaffer | ................ | G06Q 50/06 |
| | | | | 700/291 |
| 2012/0311141 A1* | 12/2012 | Durazzo | ............ | H04W 52/225 |
| | | | | 709/224 |
| 2018/0284706 A1* | 10/2018 | Anubi | ................. | G05B 19/042 |
| 2019/0347577 A1* | 11/2019 | Ba | .......................... | G06N 20/00 |
| 2020/0106269 A1* | 4/2020 | Hannon | ................. | H02J 3/144 |
| 2021/0133462 A1* | 5/2021 | Roberts | ................ | G06F 18/214 |
| 2021/0317759 A1* | 10/2021 | Tralshawala | ........... | H02J 3/003 |
| 2022/0253078 A1* | 8/2022 | Reeder | .............. | G05D 23/1923 |

OTHER PUBLICATIONS

Dong, Z., et al., "Hourly Energy Consumption Prediction of an Office Building Based on Ensemble Learning and Energy Consumption Pattern Classification," Energy & Buildings, ELSEVIER, vol. 241, 110929, https://doi.org/10.1016/j.enbuild.2021.110929, Mar. 19, 2021, 15 pages.

Guarino, N., et al., "Ontologies and Knowledge Bases," Towards Very Large Knowledge Bases, IOS Press, Amsterdam, Jan. 1995, 7 pages.

Liu, T-H., et al., "A Fault Management Protocol for Low-Energy and Efficient Wireless Sensor Networks," Journal of Information Hiding and Multimedia Signal Processing, vol. 4, No. 1, Jan. 2013, 12 pages.

* cited by examiner

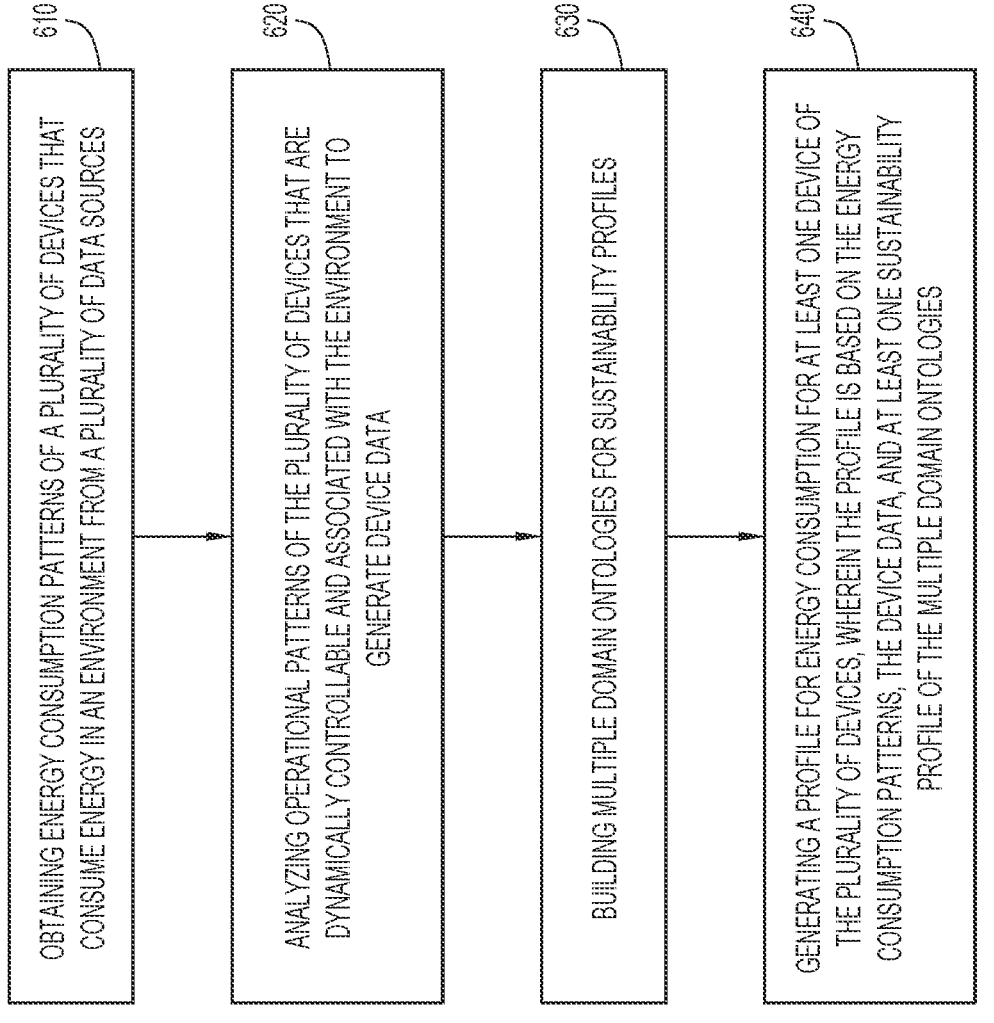

610

OBTAINING ENERGY CONSUMPTION PATTERNS OF A PLURALITY OF DEVICES THAT CONSUME ENERGY IN AN ENVIRONMENT FROM A PLURALITY OF DATA SOURCES

620

ANALYZING OPERATIONAL PATTERNS OF THE PLURALITY OF DEVICES THAT ARE DYNAMICALLY CONTROLLABLE AND ASSOCIATED WITH THE ENVIRONMENT TO GENERATE DEVICE DATA

630

BUILDING MULTIPLE DOMAIN ONTOLOGIES FOR SUSTAINABILITY PROFILES

640

GENERATING A PROFILE FOR ENERGY CONSUMPTION FOR AT LEAST ONE DEVICE OF THE PLURALITY OF DEVICES, WHEREIN THE PROFILE IS BASED ON THE ENERGY CONSUMPTION PATTERNS, THE DEVICE DATA, AND AT LEAST ONE SUSTAINABILITY PROFILE OF THE MULTIPLE DOMAIN ONTOLOGIES

SYSTEMS AND METHODS FOR BALANCING ENERGY USAGE

CROSS REFERENCE TO RELATED APPLICATION

This application claims priority to U.S. Provisional Application No. 63/497,512, filed Apr. 21, 2023, the entirety of which is incorporated herein by reference.

TECHNICAL FIELD

The present disclosure relates to systems and methods for balancing energy usage in an environment including a plurality of devices.

BACKGROUND

As energy demand around the world has increased, pressure from environmental concerns and energy price volatility has heightened the need for energy conservation and alternative energy sources. An increasing number of devices consume energy or power including electricity. Companies, industries, manufactures, and cities each have the problem of proper energy management. Moreover, as sustainability has been an extremely relevant issue in recent years, many of these entities have made public commitments in terms of sustainability targets.

BRIEF DESCRIPTION OF THE DRAWINGS

FIG. 6 is a flow chart depicting a method for balancing energy usage, according to an example embodiment.

DESCRIPTION OF EXAMPLE EMBODIMENTS

Overview

Presented herein are techniques for balancing energy usage. According to one aspect a computer-implemented method involves obtaining energy consumption patterns of a plurality of devices that consume energy in an environment from a plurality of data sources. The method further involves analyzing operational patterns of the plurality of devices that are dynamically controllable and associated with the environment to generate device data. The method further involves building multiple domain ontologies for sustainability profiles. The method further involves generating a profile for energy consumption for at least one device of the plurality of devices, wherein the profile is based on the energy consumption patterns, the device data, and at least one sustainability profile of the multiple domain ontologies.

EXAMPLE EMBODIMENTS

An environment with a plurality of energy consuming devices can be a networked environment. The devices are not necessarily from the same manufacturer, nor is it predictable how many devices are connected over time and how energy consumption varies based on the energy usage of the devices. Therefore, monitoring consumption by making consistent and equivalent measurements across different devices from different manufacturers is difficult. Determining an equivalent emissions measurement across the devices and reducing the emissions, while still maintaining the functionality of the network effective for intended purposes, is also difficult.

Presented herein are techniques for balancing energy usage based on the use of a pre-available knowledge base for the devices with a combination of real time analysis of the devices and an adaptive decision engine. Mechanism of the presented techniques can leverage the use of multiple emission or sustainability profiles by characterizing each connected device or object and the consequent optimization of the overall sustainability factor through the dynamic use of multi-factor optimization criteria. The multi-factor optimization criteria can be Artificial Intelligence (AI) based.

Figure 1:
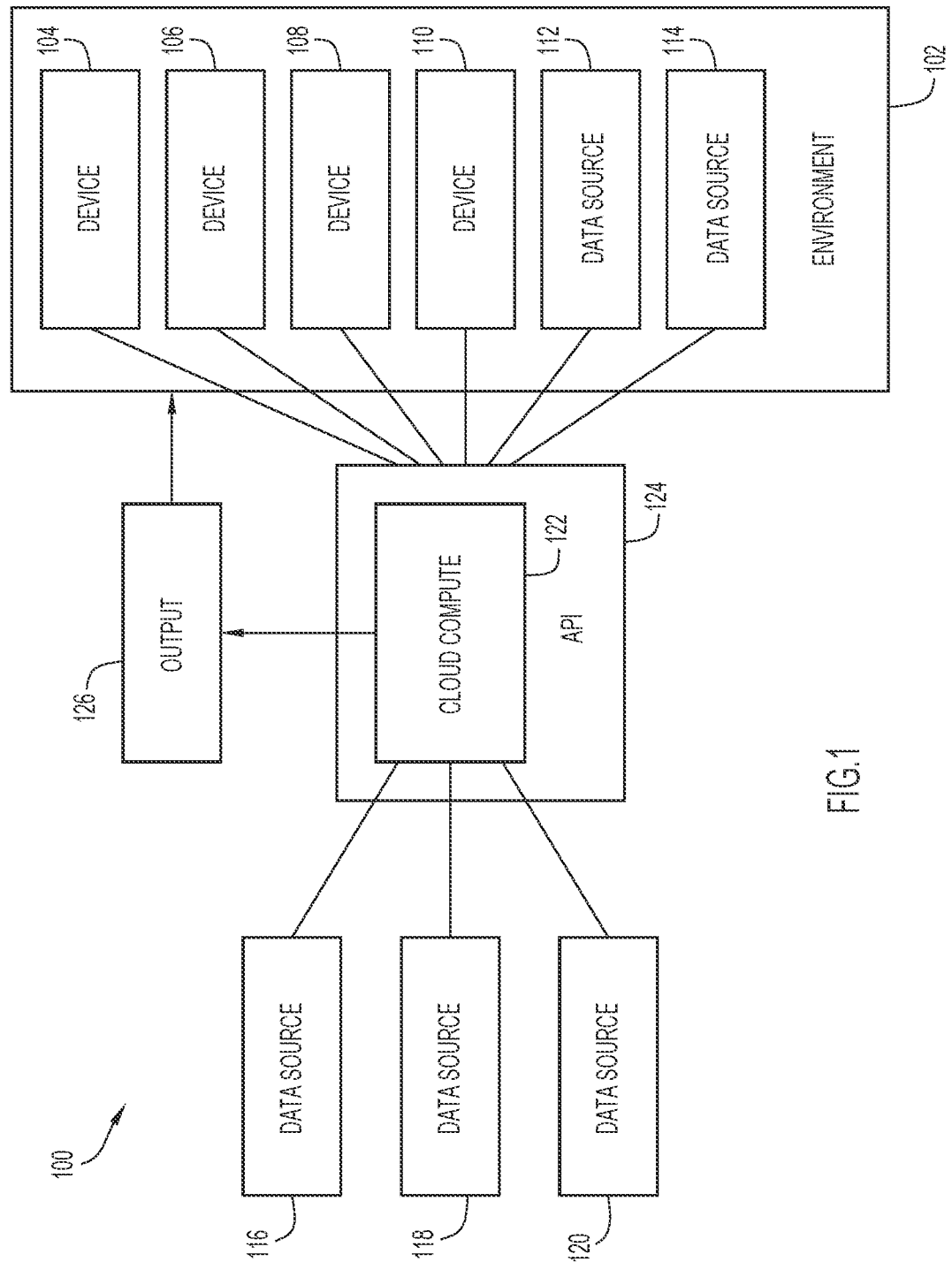
FIG. 1 is a block diagram of an example system for balancing energy usage, according to an example embodiment.

FIG. 1 shows an example system 100 that includes an environment 102 with a plurality of devices including devices 104, 106, 108, and 110. The environment 102 can also include data sources 112 and 114. The environment 102 can be any type of environment that includes energy consuming devices such as a room, a building, a meeting room, a conference room, a data center room, a floor of a building, a house, etc. The environment 102 can be a networked environment where the devices 104, 106, 108, and 110 are each connected to the same network. The devices can be hardwired to the network or can communicate to the network wirelessly via protocols such as Bluetooth, Wi-Fi, or radio transmissions. The devices 104, 106, 108, and 110 can be any type of energy consuming device including, but not limited to, a Heating, Ventilation, and Air Conditioning (HVAC controller), presence sensors, video devices, phones, Power over Ethernet (PoE) switches, servers, network switches, routers, network controllers, monitors, environmental sensors, energy systems, computing devices, lights, electric car chargers, etc.

The data sources 112 and 114 can be a source of data related to the consumption of energy of the devices 104, 106, 108, and 110. Data sources 116, 118, and 120 are located outside the environment 102 and can also be sources of data related to the consumption of energy of devices located within environment 102. Data related to the consumption of energy of the devices can come from the devices themselves or from other sources. For example, the data sources 112, 114, 116, 118, and 120 can be calendar data, weather data, data related to energy consumption of the environment 102 from a utility company, data from an application monitoring the devices, or pre-available knowledge about the device. The pre-available knowledge can be device data from the manufacturer that is stored in a database. The pre-available knowledge or pre-defined knowledge about energy consumption of a device can be maximum power, power profiles, workload power usage, etc. It should be appreciated that the techniques presented herein can include any number of devices and data sources beyond what is depicted in FIG. 1. The devices 104, 106, 108, and 110 can be referred to as sustainability functional units. A sustainability functional unit can be defined as a set of devices that are highly co-related from a power consumption optimization perspective.

The system 100 can include cloud compute 122 which is capable of receiving energy consumption data from the devices 104, 106, 108, and 110 and the data sources 112, 114, 116, 118, and 120. Cloud compute 122 can monitor energy consumption of the devices in real time to dynamically discover energy consumption patterns of the devices 104, 106, 108, and 110. The monitoring of the devices 104, 106, 108, and 110 can be accomplished using an ad-hoc protocol. Basic data or in-depth data received from the devices 104, 106, 108, and 110 can be referred to as a telemetry.

Cloud compute 122 can be one or more remote servers hosted on the internet to store, manage, and process data. The cloud compute 122 can be located physically remote with respect to the environment 102 as well as data sources 116, 118, and 120. The cloud compute 122 can interface with the devices 104, 106, 108, and 110 and the data sources 112, 114, 116, 118, and 120 via an Application Programming Interface (API) 124.

Cloud compute 122 can be used to accomplish an adaptive process for balancing energy of the devices within in the environment 102. For example, cloud compute 122 can be used for profile discovery and topography of consumption patterns by obtaining energy consumption patterns of the devices that consume energy in the environment 102 from the data sources. Cloud compute 122 can then be used for analysis and optimization of the devices within the environment 102. The analysis and optimization can be accomplished by analyzing operational patterns of the devices that are dynamically controllable and associated with the environment to generate device data. The analysis and optimization can further be accomplished by building and maintaining multiple domain ontologies for sustainability profiles. Cloud compute 122 can then be used for overall network optimization by sending optimized profiles to the devices. The optimized profiles can be referred to as a profile for energy consumption for at least one of the devices. The optimized profiles can be developed by the cloud compute 122 based on the energy consumption patterns, the device data, and at least one sustainability profile of the multiple domain ontologies.

The sending of the optimized profiles to the devices is depicted as output 126. Output 126 can be commands or configuration changes that are sent to at least one of the devices 104, 106, 108, and 110 related to the energy consumption of the device. For example, the output 126 can be a command to charge an electric car during a particular window of time based on the optimized profile. The optimized profile may determine the particular window of time based on when other devices are consuming lower amounts of energy compared to other windows of time. Another example can be a device that is a mobile wireless device that is sent into standby mode by the optimized profile. Another example can be a POE switch that switches off direct current on particular ports during particular windows of time based on the optimized profile.

The cloud compute 122 can also employ Fault Managed Power (FMP) techniques to communicate with and send power to the devices 104, 106, 108, and 110. FMP techniques can send power from one or more power transmitters over network cables to devices and can monitor the power for faults. FMP techniques can be used to generate analytics about the devices that can be used by the cloud compute 122 to generate optimized profiles for energy consumption. The analytics can include voltage (V), current (+I or −I) with the power flow into a receiving device or current with flow out of receiving device, Total Harmonic Distortion (THD), Partial THD (PTHD), and can be used to set an Identification (ID) number from an FMP source. At the power up of a device, the Transmission (Tx) of FMP can perform an analysis of the wire pair of the network cable used to send power and communications to the device. The analysis can include frequency response, wire length, and loop resistance which can be known at start up. The FMP transmitter can share data regarding V, +I, −I, and THD with the cloud compute 122. A receiver (Rx) associated with one of the devices can share data regarding V, +I, −I, and THD with the FMP transmitter which is then passed on to the cloud compute 122. Thus, the cloud compute 122 can have continuous visibility into the power consumption of the devices. This analysis and data gathered or generated by FMP techniques can be employed to obtain energy consumption patterns related to a device. Similarly, the techniques presented herein can employ data from PoE to obtain energy consumption patterns related to a device. In one example, commands sent via output 126 can be commands sent using FMP techniques or PoE techniques.

Figure 2:
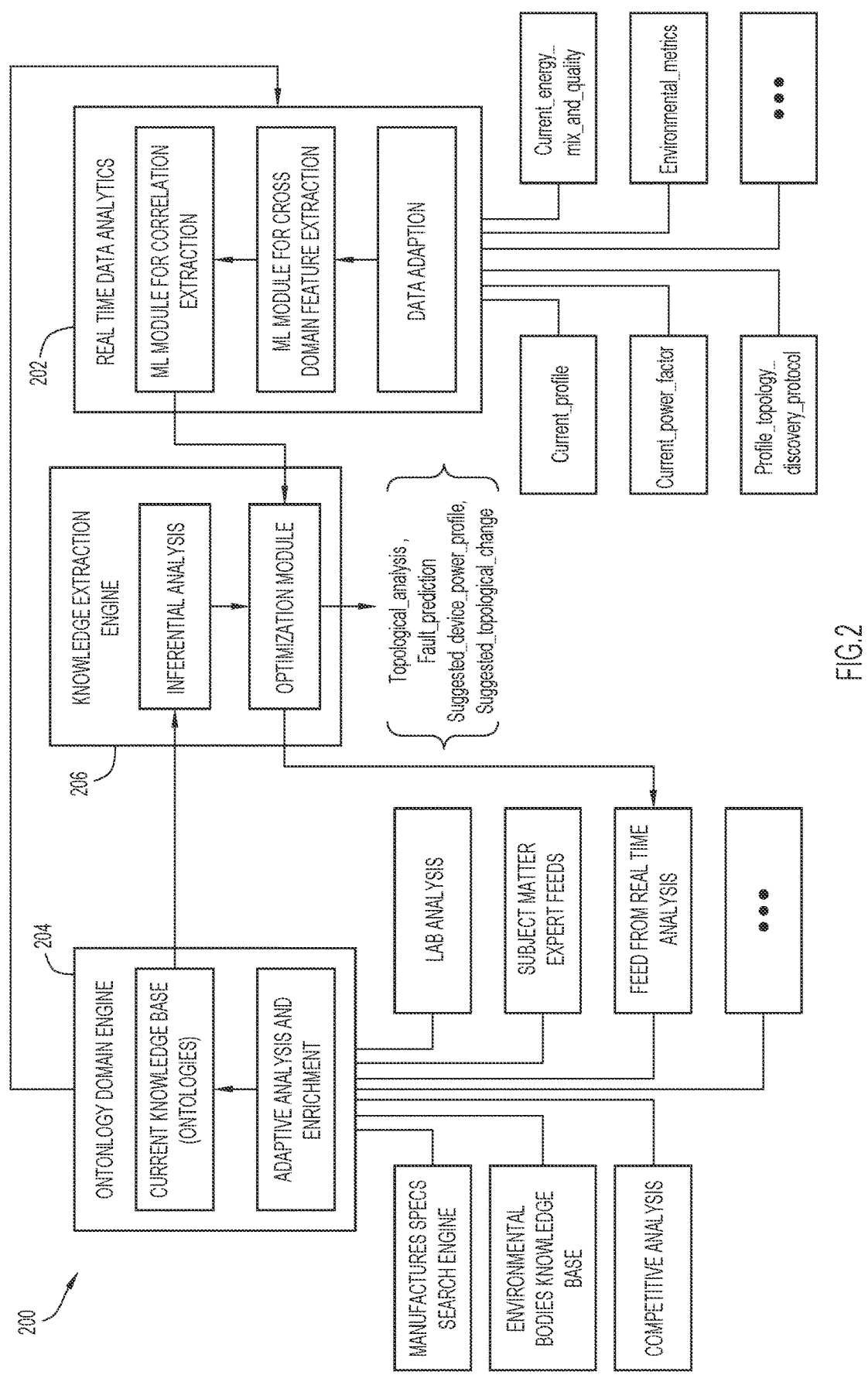
FIG. 2 is a block diagram of an adaptive mechanism for balancing energy usage, according to an example embodiment.

FIG. 2 depicts an adaptive mechanism 200 that can be used to implement the processes of the techniques presented herein. The adaptive mechanism can be performed within the cloud compute 122 of FIG. 1 and be used to generate the optimized profiles. The adaptive mechanism 200 can include a real time data analytics engine 202, an ontology domain engine 204, and a knowledge extraction engine 206.

The real time data analytics engine 202 can be dedicated to homogenizing data coming from multiple non-homogeneous or heterogenous in real time and from pre-defined knowledge sources. For example, the devices of the environment 102 of FIG. 1 can generate data using different formats, units of measurements, protocols, and techniques from one another. This differences in data type between devices can be referred to as non-homogeneous or heterogenous data. The real time data analytics engine 202 is capable of extracting, monitoring, or receiving non-homogeneous data from different devices and homogenizing the data in real time so that the data from the different devices is then stored in the same format and can be compared or related to one another. The homogenized data that is obtained from the devices in real time is data related to the actual energy usage of the devices as opposed to manufacturer data or specifications regarding the device.

Through the application of Machine Learning (ML) algorithms on individual and diverse set of data, the real time data analytics engine 202 can extract higher level features regarding the devices. The data can include current power factor, energy mix and quality, device specifications, environmental data, profile topology protocol input, etc. The higher level features can include network power usage topology, sustainability functional units, etc.

The real time data analytics engine 202 can have the task of identifying elements of diversion from optimal conditions and potential risks associated to the devices and/or sustainability functional units (e.g. a meeting room as composed by a set of single devices) by applying machine learning algorithms (e.g. Recurrent Neural Network (RNN), RandomForest, etc.) on data sets of increasing abstraction level. The real time data analytics engine 202 can constitute short-term memory of the adaptive mechanism 200, and can include extracting the instantaneous evidence derived from the examination of devices such as sensors in real or near-real time. The real time data analytics engine 202 can possibly apply Edge Computing solutions (e.g. running on Fault Managed Power (FMP) Switches in a building) to facilitate local processing.

The real time data analytics engine 202 can include the following elements:

Processing elements (Compute Processing Unit (CPU)/ Graphical Processing Unit (GPU)) to process sensor data on the basis of the specific algorithms required Algorithms for processing data sets (e.g. Convolutional Neural Network (CNN), RNN, Routing protocols, etc.)

Memory elements to store both data and processing results

Network interface elements to allow the exchange of information to other functional blocks, but also the acquisition of time series from historical databases The real time data analytics engine 202 can include a data adaption module for adapting or homogenizing data from the devices. The data can include current profile, current power factor, profile topology discovery protocol, current energy mix and quality, and environmental metrics. The data adaption module can send data to a machine learning module in the real time data analytics engine 202 for domain feature extraction. The machine learning module can send data to another machine learning module in the real time data analytics engine 202 for correlation extraction.

The ontology domain engine 204 can be used for the purpose of building and maintaining multiple domain ontologies that are up-to-date and co-related. Referring to the example of optimized profiles or sustainability profiles for the devices of the environment 102 of FIG. 1, an ontology may include:

the relationships between the different types of devices (e.g. PoE switches and Internet Protocol (IP) phones), the concept of sustainability functional unit as a dynamic combination of network elements and relevant scopes, the definition of power profiles, both as ingested by manufacturer data sheets and discovered by a profile_topology_discovery_protocol as well, and the relationship among different properties of non-homogeneous data-sets (e.g. environmental metrics and power, presence sensors and power, etc.).

Each ontology in the ontology domain engine 204 defines a set of knowledge, the conceptual space that focuses current knowledge (long-term memory) on the specific domain phenomenon (e.g. environmental parameters or presence sensors influencing devices and sustainability functional units, or power factors curves related to feature/workload/temperature, etc.). By using, for example, the knowledge graph structure and a language formalization such as Ontology Web Language (OWL), a generalization of knowledge can be allowed or generated that is easily accessible and manageable on a human level by domain experts. Such an ontology domain engine 204 can be adaptive in that the ontology domain engine 204 can constantly draw on external information flows (e.g. web searches, short-term memory analysis, new data-sheet, etc.) to maintain and expand the relevant ontologies. The ontology domain engine 204 can be developed on a cloud-based platform and can consists of the following elements:

Processing elements (CPU/GPU) to process the information flows.

Network interface elements to enable the exchange of information both to the other functional blocks and with the sources of the information flows.

Memory elements to store the knowledge structure created.

Processing algorithms (e.g. ONTOLearn, Protege, OntoEdit, etc.) for building and maintaining ontologies.

The ontology domain engine 204 can include an adaptive analysis and enrichment module that analyzes and enriches data such as a manufactures specs search engine, environmental bodies knowledge base, competitive analysis, lab analysis, subject matter expert feeds, and feed from the real time data analytics engine 202. The adaptive analysis and enrichment module can then output data to generate ontologies within the ontology domain engine 204 which can be referred to as a current knowledge base.

The knowledge extraction engine 206 can be referred to as a knowledge extraction and recommendation engine that can combine real time analysis extracted by the real time data analytics engine 202 with knowledge from the ontology domain engine 204 to identify evidence (e.g. power usage not optimal for sustainability functional unit X, device Y running in highly inefficient power factor zone, power topology not optimized, etc.) and suggests a course of action such as an optimized profile (e.g. change device Y profile, optimize power network topology of sustainability functional unit X, etc.) to achieve the result of network power optimization and fault prevention. The knowledge extraction engine 206 can include the following elements:

Processing elements (CPU/GPU) to process the cross-analysis process between the ontology domain engine and the real time analytics engine.

Network interface to enable the exchange of information to the other functional blocks.

Memory elements to store the temporary analysis structure, domain ontology structures and extracted evidence structures.

Processing algorithms (e.g. ML) for the identification of the relevant domain ontologies and the related mapping of the real time features/ontologies sets, and finally for the identification of actions.

The knowledge extraction engine 206 can include an inferential analysis module that receives input from the machine learning module for correlation extraction of the real time data analytics engine 202 as well as input from the ontologies of the ontology domain engine 204. The inferential analysis module send data to an optimization module of the knowledge extraction engine 206 which can output the optimized profile for a device that can include topological analysis, fault prediction, suggested device power profile, and suggested topological change for the device.

In one embodiment, the adaptive mechanism 200 that includes the real time data analytics engine 202, the ontology domain engine 204, and the knowledge extraction engine 206 can be referred to as a single artificial intelligence model that is used to analyze the energy consumption patterns of the device and the device data to generate the profile for energy consumption that is optimized based on the at least one sustainability profile.

Figure 3:
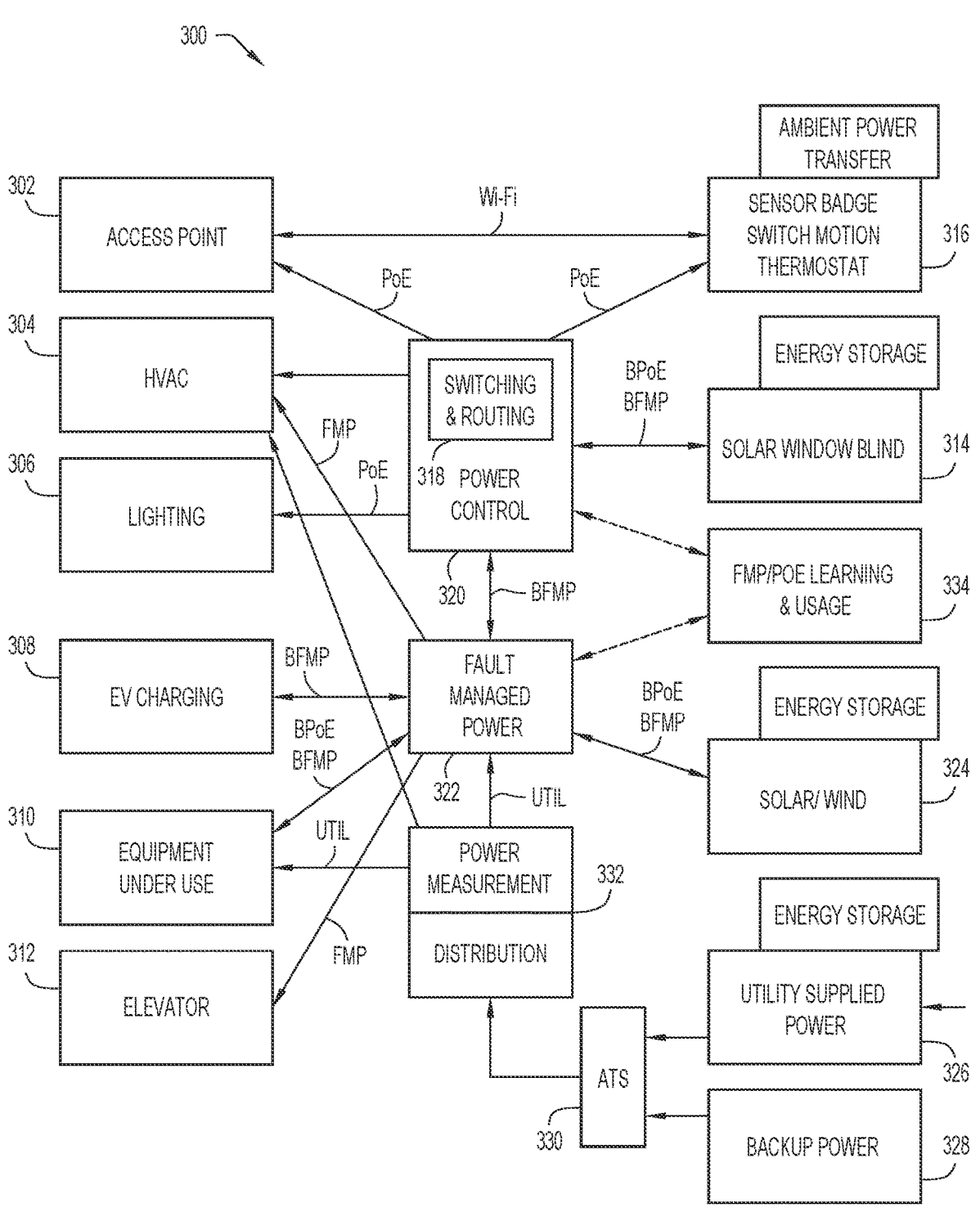
FIG. 3 is a block diagram of an example system for balancing energy usage, according to an example embodiment.

FIG. 3 shows an example system 300 for balancing energy usage using techniques presented herein. The system 300 can represent the digital elements of an environment such as a building and can be described as a topology.

The system 300 can include devices similar to the devices 104, 106, 108, and 110 of FIG. 1 such as access point 302, HVAC 304, lighting 306, Electric Vehicle (EV) charging 308, equipment under use 310, elevator 312, solar window blind 314, and device 316 which can include a sensor, a badge, a switch, a motion sensor, and a thermostat. The device 316 can wirelessly communicate with the access point 302 using a protocol such as Wi-Fi® wireless local area networking. The system can also include switching and routing 318 which can be a network switch, a patch panel, router, or other network device for connecting to devices via network cables. The switching and routing 318 can be part of a power control 320. The power control 320 can send power over network cables to devices using techniques such as PoE and FMP. In some cases PoE can be bi-directional PoE (BPoE) and FMP can be bi-directional FMP (BFMP). The power control 320 can receive power from an FMP source 322 which can receive power from multiple sources such as solar or wind power 324, utility supplied power 326, or backup power 328. The solar or wind power 324 and the utility supplied power 326 can include an energy storage such as a battery. The utility supplied power 326 and the backup power 328 can be routed through an Automatic Transfer Switch (ATS) 330 as well as power measurement and distribution 332 before going to FMP source 322.

The system can also include FMP and POE learning and usage 334. The FMP and POE learning and usage 334 can be the same as cloud compute 122 of FIG. 1 and can be used to monitor and analyze devices to generate optimized profiles. The FMP and POE learning and usage 334 can be an adaptive mechanism that can include the aforementioned real time data analytics engine, an ontology domain engine, and a knowledge extraction engine. The FMP and POE learning and usage 334 can output optimized profiles to the power control 320 and FMP source 322 that can be used to control power consumption of the connected devices to balance energy usage.

Figure 4:
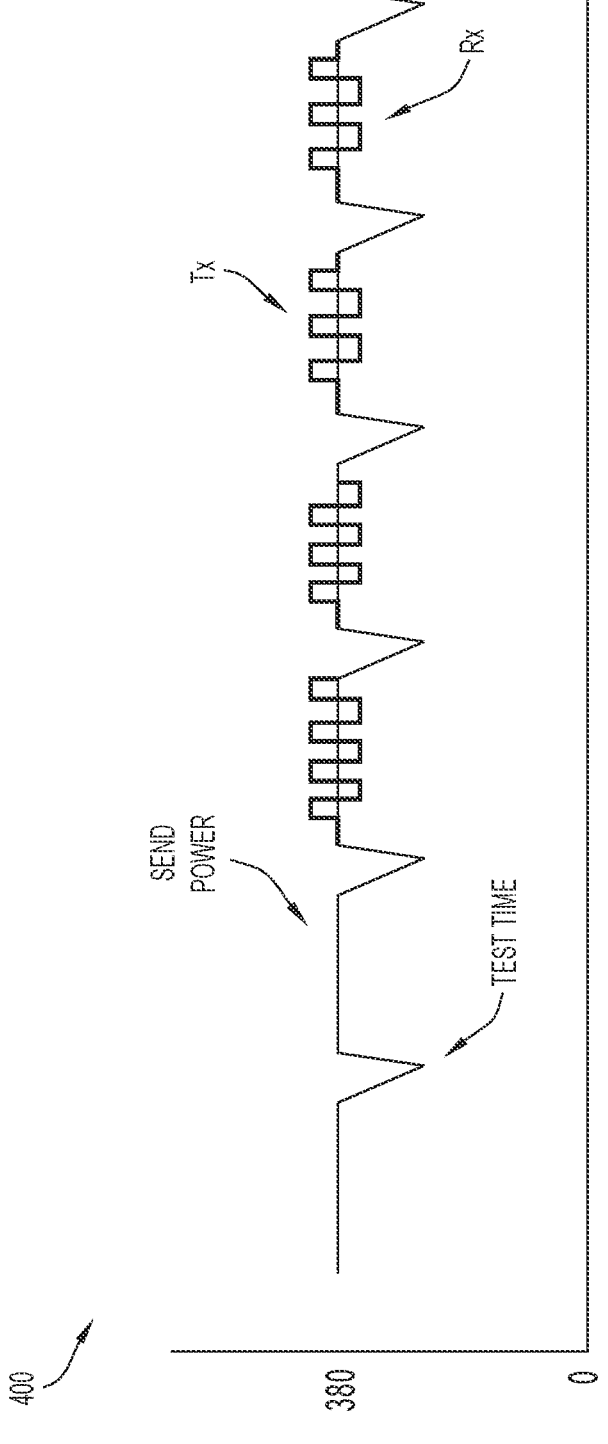
FIG. 4 is a graph of sending power and communications to a device, according to an example embodiment.

FIG. 4 shows a graph 400 depicting use of FMP to transmit power in accordance with embodiments of the present technology. The graph 400 depicts sending power as well as transmitting (Tx) and Receiving (Rx) communications which can be referred to as low bandwidth FMP communication methods. In one embodiment the graph 400 depicts Non-Return-to-Zero (NRZ) modulation with 8B10B coding at 1 KHz. In one example, the Tx can start transmitting first, then Rx and Tx can alternate until the system is reset. In some examples, the Tx starts first with the initialization of low bandwidth communications over FMP. Methods using techniques of low bandwidth FMP communication can have the ability to not interfere with an 80 Hz safety check, the communications can be sent during non-safety check periods, and may not be 10/100/1000/10G Ethernet. The low bandwidth FMP communications can be in addition to 1 kHz communications.

Using low bandwidth FMP communications can result in 10 bits being sent between safety checks which can occur every 10 milliseconds. This can mean that 1 byte is sent in each transmission window using these techniques of low bandwidth FMP communications. The basic structure of the communication can include a frame with: start sequence, from, to, data, and check frame. The data portion of the frame can include: voltage, current, THD, and Identification (ID). The ID can be source, destination, or chained device identifiers. In one example, the ID can be a Secure Unique Device Identifier (SUDI).

A communication sent over FMP or PoE for power control of a device can start with ID at the top and build down in the following order: FMP Tx to FMP Rx to Shutdown to do not turn on to OK to turn on and then power on. A force override communication can also be sent to power off Tx, power off Rx with local sense to turn back on and keep safety check on, and force Tx into low voltage state and then wait for Tx to be active or Rx to request an action and then got to FMP start up. In this way a sensor or other device can drive a request.

Figure 5:
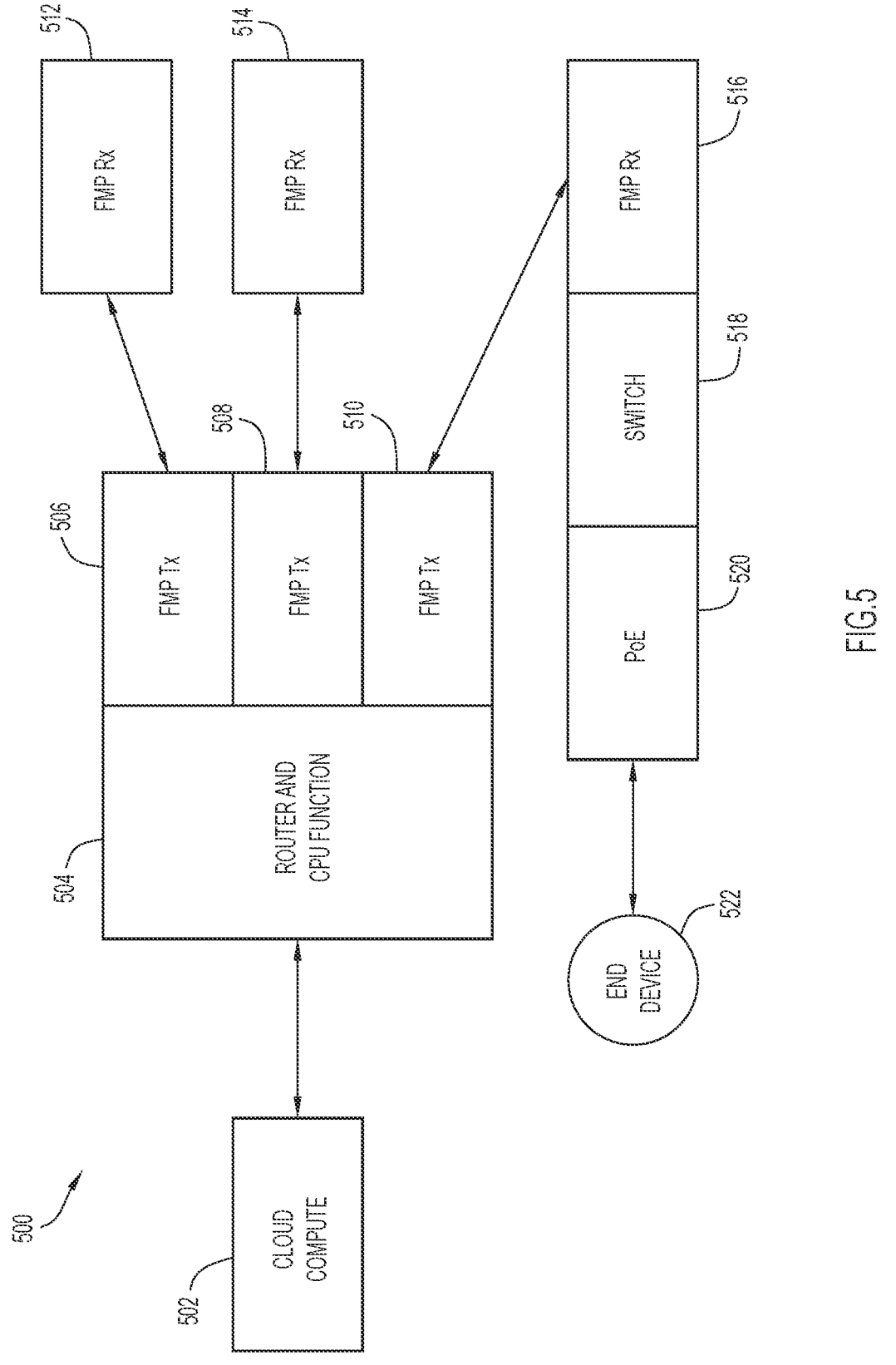
FIG. 5 is a block diagram of an example system for balancing energy usage, according to an example embodiment.

FIG. 5 shows a system 500 for information flow, observation, and control of energy for devices in an environment. System 500 includes cloud compute 502 which can have the same features and capabilities as cloud compute 122 of FIG. 1. The cloud compute 502 can communicate with a router and CPU function 504 to set ID and send communications and power through FMP Tx 506, 508, and 510 to FMP Rx 512, 514, and 516. The power sent between FMP Tx 506, 508, and 510 and FMP Rx 512, 514, and 516, respectively, can be sent using FMP techniques and the communications can be referred to as low bandwidth FMP communications. The FMP Rx 512, 514, and 516 can each be associated with a device such as the devices of environment 102 of FIG. 1 and can each have a CPU control. The router and CPU function 504 can identify communications to and from the different devices associated with the FMP Rx 512, 514, and 516. In one example, the FMP Rx 516 can be associated with a switch 518 which can be a CAT switch CPU that can receive the FMP communications from the FMP Tx 510 and send the communications and power through PoE 520 to an end device 522. Thus, the FMP communications and power can be changed via switch 518 to PoE power and communications for the end device 522.

In one embodiment, the system 500 can be used with the techniques presented herein to balance energy usage via an optimized profile to turn on a monitor. A command to turn on the monitor based on the optimized profile can be originated at the cloud compute 502 which sends the command to the FMP Tx 506 via the router and CPU function 504. The FMP Tx 506 sends the command to FMP Rx 512, which is associated with the monitor, to turn on the monitor. Data from the monitor can then be routed back to the cloud compute 502. In another example, the same path can be used to send commands to the monitor from the cloud compute 502 to put the monitor into low power mode. The command to enter low power mode can be based on the optimized profile. The monitor can accept or deny the command to enter low power mode and can send data regarding whether or not low power mode was entered back to the cloud compute 502. In another example, the cloud compute can send a command to the monitor to turn off based on the optimized profile. The command can be accepted or rejected at the monitor and data can be sent back to the cloud compute regarding why the command was rejected such as an emergency or life issue. In one example, the device, such as the monitor, can send a request to the cloud compute 502 via the FMP communications to enter low power mode or to turn off. In such an example, the FMP Rx 512 can force the FMP Tx 506 to turn on and forward communications to the cloud compute 502. The request from the monitor can be unsolicited by the cloud compute 502.

FIG. 6 illustrates a flow chart for a computer-implemented method 600 for balancing energy usage. This method 600 is applicable to operation of any of the devices, cloud computes, mechanisms, and engines presented herein. The method 600 includes, at step 610, obtaining energy consumption patterns of a plurality of devices that consume energy in an environment from a plurality of data sources. The method 600 further includes, at step 620, analyzing operational patterns of the plurality of devices that are dynamically controllable and associated with the environment to generate device data. The method 600 further includes, at step 630, building multiple domain ontologies for sustainability profiles. The method 600 further includes, at step 640, generating a profile for energy consumption for at least one device of the plurality of devices, wherein the profile is based on the energy consumption patterns, the device data, and at least one sustainability profile of the multiple domain ontologies.

Balancing Energy Usage Aspects

In some aspects, the techniques described herein relate to a computer-implemented method for balancing energy usage, including: obtaining energy consumption patterns of a plurality of devices that consume energy in an environment from a plurality of data sources; analyzing operational patterns of the plurality of devices that are dynamically controllable and associated with the environment to generate device data; building multiple domain ontologies for sustainability profiles; and generating a profile for energy consumption for at least one device of the plurality of devices, wherein the profile is based on the energy consumption patterns, the device data, and at least one sustainability profile of the multiple domain ontologies.

In some aspects, the techniques described herein relate to a method, wherein obtaining the energy consumption patterns from the plurality of data sources includes obtaining heterogeneous types of data in different formats using different protocols that are homogenized in real-time wherein the data represents amounts of energy used by the plurality of devices including max power, power profiles, workload power, current power usage, device specifications, environmental data, energy mix and quality, and/or power usage metrics.

In some aspects, the techniques described herein relate to a method, wherein analyzing the operational patterns of the plurality of devices includes applying machine learning algorithms to data from the plurality of data sources to extract the device data.

In some aspects, the techniques described herein relate to a method, wherein generating the profile for energy consumption employs a single artificial intelligence model to analyze the energy consumption patterns and the device data to generate the profile for energy consumption that is optimized based on the at least one sustainability profile.

In some aspects, the techniques described herein relate to a method, wherein obtaining the energy consumption patterns includes obtaining data from data sources representing current energy consumption of the plurality of devices representing actual energy usage gathered in real time.

In some aspects, the techniques described herein relate to a method, wherein the obtaining the energy consumption patterns from the plurality of data sources includes obtaining power consumption data gathered from signaling in fault managed powered techniques associated with power supplied to the plurality of devices from one or more power transmitters.

In some aspects, the techniques described herein relate to a method, wherein obtaining the energy consumption patterns from the plurality of data sources includes obtaining data gathered using Power over Ethernet (POE) signaling.

In some aspects, the techniques described herein relate to a method, wherein the plurality of data sources include Heating, Ventilation, and Air Conditioning (HVAC) controllers, presence sensors, video devices, phones, PoE switches, servers, network switches, environmental sensors, energy systems, electric vehicle chargers, routers, monitors, network controllers, calendar data, and/or weather data.

In some aspects, the techniques described herein relate to a method, further including: sending commands based on the profile for energy consumption to the at least one device.

In some aspects, the techniques described herein relate to a method, wherein the commands are sent via fault managed power signaling techniques.

In some aspects, the techniques described herein relate to one or more non-transitory computer readable storage media encoded with software including computer executable instructions that, when executed by a processor, cause the processor to perform a method for balancing energy usage, including: obtaining energy consumption patterns of a plurality of devices that consume energy in an environment from a plurality of data sources; analyzing operational patterns of the plurality of devices that are dynamically controllable and associated with the environment to generate device data; building multiple domain ontologies for sustainability profiles; and generating a profile for energy consumption for at least one device of the plurality of devices, wherein the profile is based on the energy consumption patterns, the device data, and at least one sustainability profile of the multiple domain ontologies.

In some aspects, the techniques described herein relate to a non-transitory computer readable storage media, wherein obtaining the energy consumption patterns from the plurality of data sources includes obtaining heterogeneous types of data in different formats using different protocols that are homogenized in real-time wherein the data represents amounts of energy used by the plurality of devices including max power, power profiles, workload power, current power usage, device specifications, environmental data, energy mix and quality, and/or power usage metrics.

In some aspects, the techniques described herein relate to a non-transitory computer readable storage media, wherein analyzing the operational patterns of the plurality of devices includes applying machine learning algorithms to data from the plurality of data sources to extract the device data.

In some aspects, the techniques described herein relate to a non-transitory computer readable storage media, wherein generating the profile for energy consumption employs a single artificial intelligence model to analyze the energy consumption patterns and the device data to generate the profile for energy consumption that is optimized based on the at least one sustainability profile.

In some aspects, the techniques described herein relate to a non-transitory computer readable storage media, wherein obtaining the energy consumption patterns includes obtaining data from data sources representing current energy consumption of the plurality of devices representing actual energy usage gathered in real time.

In some aspects, the techniques described herein relate to a non-transitory computer readable storage media, wherein the obtaining the energy consumption patterns from the plurality of data sources includes obtaining power consumption data gathered from signaling in fault managed powered techniques associated with power supplied to the plurality of devices from one or more power transmitters.

In some aspects, the techniques described herein relate to a non-transitory computer readable storage media, further including: sending commands based on the profile for energy consumption to the at least one device.

In some aspects, the techniques described herein relate to an apparatus for balancing energy usage, including: a memory; a network interface configured to enable network communications; and a processor, wherein the processor is configured to perform a method including: obtaining energy consumption patterns of a plurality of devices that consume energy in an environment from a plurality of data sources; analyzing operational patterns of the plurality of devices that are dynamically controllable and associated with the environment to generate device data; building multiple domain ontologies for sustainability profiles; and generating a profile for energy consumption for at least one device of the plurality of devices, wherein the profile is based on the energy consumption patterns, the device data, and at least one sustainability profile of the multiple domain ontologies.

In some aspects, the techniques described herein relate to an apparatus, wherein obtaining the energy consumption patterns from the plurality of sources includes obtaining heterogeneous types of data in different formats using different protocols that are homogenized in real-time wherein the data represents amounts of energy used by the plurality of devices including max power, power profiles, workload power, current power usage, device specifications, environmental data, energy mix and quality, and/or power usage metrics.

In some aspects, the techniques described herein relate to an apparatus, further including: sending commands based on the profile for energy consumption to the at least one device.

Figure 7:
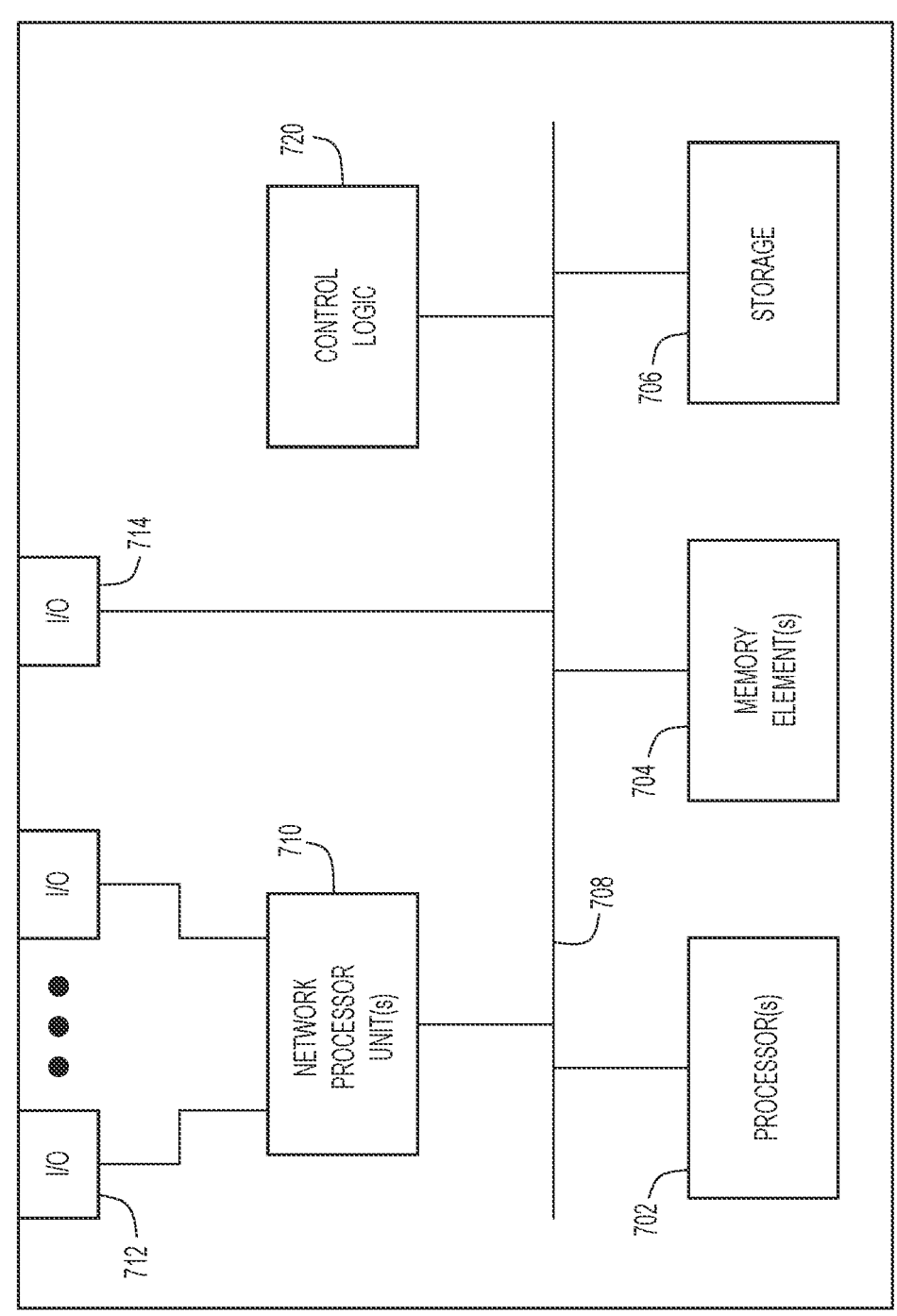
FIG. 7 is a block diagram of a computing or networking apparatus, according to an example embodiment.

FIG. 7 illustrates a hardware block diagram of a device 700 that may perform functions associated with operations discussed herein in connection with the techniques depicted in FIGS. 1-5. For example, the device 700 can be the cloud compute 122 of FIG. 1, the devices 104, 106, 108, and 110 of FIG. 1, or the cloud compute 502 of FIG. 5.

In at least one embodiment, the device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method for balancing energy usage, comprising:
    obtaining energy consumption patterns of a plurality of devices that consume energy in an environment from a plurality of data sources, wherein the energy consumption patterns include heterogeneous types of data in different formats obtained using different protocols, and wherein the data representing amounts of energy consumed by the plurality of devices includes one or more of: maximum power, power profiles, workload power, current power usage, device power specifications, environmental data, energy mix and quality, and power usage metrics;
    homogenizing the energy consumption patterns to a same format in real-time;
    analyzing operational patterns of the plurality of devices that are dynamically controllable and associated with the environment to generate device data;
    building multiple domain ontologies for sustainability profiles;
    generating a profile for energy consumption for at least one device of the plurality of devices, wherein the profile is based on the energy consumption patterns, the device data, and at least one sustainability profile of the multiple domain ontologies; and
    instantiating, based on the profile for energy consumption, a configuration change to the at least one device of the plurality of devices.

2. The computer-implemented method of claim 1, wherein analyzing the operational patterns of the plurality of devices includes applying machine learning algorithms to data from the plurality of data sources to extract the device data and to identify one or more risks associated with the plurality of devices.

3. The computer-implemented method of claim 1, wherein generating the profile for energy consumption employs a single artificial intelligence model to analyze the energy consumption patterns and the device data to generate the profile for energy consumption that is optimized based on the at least one sustainability profile.

4. The computer-implemented method of claim 1, wherein obtaining the energy consumption patterns includes obtaining data from data sources representing current energy consumption of the plurality of devices representing actual energy usage gathered in real time.

5. The computer-implemented method of claim 1, wherein the obtaining the energy consumption patterns from the plurality of data sources includes obtaining power consumption data gathered from signaling in fault managed powered techniques associated with power supplied to the plurality of devices from one or more power transmitters.

6. The computer-implemented method of claim 1, wherein obtaining the energy consumption patterns from the plurality of data sources includes obtaining data gathered using Power over Ethernet (POE) signaling.

7. The computer-implemented method of claim 1, wherein the plurality of data sources include Heating, Ventilation, and Air Conditioning (HVAC) controllers, presence sensors, video devices, phones, PoE switches, servers, network switches, environmental sensors, energy systems, electric vehicle chargers, routers, monitors, network controllers, calendar data, and/or weather data.

8. The computer-implemented method of claim 1, further comprising:

sending commands based on the profile for energy consumption to the at least one device.

9. The computer-implemented method of claim 8, wherein the commands are sent via fault managed power signaling techniques.

10. One or more non-transitory computer readable storage media encoded with software comprising computer executable instructions that, when executed by a processor, cause the processor to perform a method for balancing energy usage, comprising:

obtaining energy consumption patterns of a plurality of devices that consume energy in an environment from a plurality of data sources, wherein the energy consumption patterns include heterogeneous types of data in different formats obtained using different protocols, and wherein the data representing amounts of energy consumed by the plurality of devices includes one or more of: maximum power, power profiles, workload power, current power usage, device power specifications, environmental data, energy mix and quality, and power usage metrics;

homogenizing the energy consumption patterns to a same format in real-time;

analyzing operational patterns of the plurality of devices that are dynamically controllable and associated with the environment to generate device data;

building multiple domain ontologies for sustainability profiles;

generating a profile for energy consumption for at least one device of the plurality of devices, wherein the profile is based on the energy consumption patterns, the device data, and at least one sustainability profile of the multiple domain ontologies; and instantiating, based on the profile for energy consumption, a configuration change to the at least one device of the plurality of devices.

11. The one or more non-transitory computer readable storage media of claim 10, wherein analyzing the operational patterns of the plurality of devices includes applying machine learning algorithms to data from the plurality of data sources to extract the device data and to identify one or more risks associated with the plurality of devices.

12. The one or more non-transitory computer readable storage media of claim 10, wherein generating the profile for energy consumption employs a single artificial intelligence model to analyze the energy consumption patterns and the device data to generate the profile for energy consumption that is optimized based on the at least one sustainability profile.

13. The one or more non-transitory computer readable storage media of claim 10, wherein obtaining the energy consumption patterns includes obtaining data from data sources representing current energy consumption of the plurality of devices representing actual energy usage gathered in real time.

14. The one or more non-transitory computer readable storage media of claim 10, wherein the obtaining the energy consumption patterns from the plurality of data sources includes obtaining power consumption data gathered from signaling in fault managed powered techniques associated with power supplied to the plurality of devices from one or more power transmitters.

15. The one or more non-transitory computer readable storage media of claim 10, further comprising:

sending commands based on the profile for energy consumption to the at least one device.

16. An apparatus for balancing energy usage, comprising:

a memory;

a network interface configured to enable network communications; and a processor, wherein the processor is configured to perform a method comprising:

obtaining energy consumption patterns of a plurality of devices that consume energy in an environment from a plurality of data sources, wherein the energy consumption patterns include heterogeneous types of data in different formats obtained using different protocols, and wherein the data representing amounts of energy consumed by the plurality of devices includes one or more of: maximum power, power profiles, workload power, current power usage, device power specifications, environmental data, energy mix and quality, and power usage metrics;

homogenizing the energy consumption patterns to a same format in real-time;

analyzing operational patterns of the plurality of devices that are dynamically controllable and associated with the environment to generate device data;

building multiple domain ontologies for sustainability profiles;

generating a profile for energy consumption for at least one device of the plurality of devices, wherein the profile is based on the energy consumption patterns, the device data, and at least one sustainability profile of the multiple domain ontologies; and instantiating, based on the profile for energy consumption, a configuration change to the at least one device of the plurality of devices.

17. The apparatus of claim 16, further comprising:

sending commands based on the profile for energy consumption to the at least one device.

18. The apparatus of claim 16, wherein analyzing the operational patterns of the plurality of devices includes applying machine learning algorithms to data from the plurality of data sources to extract the device data and to identify one or more risks associated with the plurality of devices.

19. The apparatus of claim 16, wherein generating the profile for energy consumption employs a single artificial intelligence model to analyze the energy consumption patterns and the device data to generate the profile for energy consumption that is optimized based on the at least one sustainability profile.

20. The apparatus of claim 16, wherein obtaining the energy consumption patterns includes obtaining data from data sources representing current energy consumption of the plurality of devices representing actual energy usage gathered in real time.

* * * * *